United States Patent [19]

Bertin et al.

[11] 4,097,566

[45] Jun. 27, 1978

[54] EXTRUSION LINE CONTROL SYSTEM

[75] Inventors: Michael C. Bertin, Irvine; Richard L. Hicksted, Orange; James M. Mitsuhashi, Los Angeles, all of Calif.

[73] Assignee: Nucleonics Data Systems, Irvine, Calif.

[21] Appl. No.: 802,442

[22] Filed: Jun. 1, 1977

[51] Int. Cl.² .......................................... B29F 3/00
[52] U.S. Cl. ........................... 264/40.7; 425/141; 425/142; 425/162; 425/164; 425/315; 425/377
[58] Field of Search .................... 425/140–142, 425/148, 162, 164, 315, 377; 264/40.4, 40.7

[56] References Cited

U.S. PATENT DOCUMENTS

| | | | |
|---|---|---|---|
| 2,726,922 | 12/1955 | Merril et al. | 425/140 |
| 3,150,213 | 9/1964 | Doering | 425/140 |
| 3,286,302 | 11/1966 | Doering | 425/141 |
| 3,875,383 | 4/1975 | Somerville et al. | 425/141 |
| 3,881,651 | 5/1975 | Wilhelm, Jr. | 425/140 |
| 3,904,338 | 9/1975 | Straumanis | 264/40.7 |
| 3,930,774 | 1/1976 | Brand et al. | 425/141 |

*Primary Examiner*—Francis S. Husar
*Assistant Examiner*—John McQuade
*Attorney, Agent, or Firm*—Harris, Kern, Wallen & Tinsley

[57] ABSTRACT

An extrusion line for producing rubber tire tread. Method and apparatus for continuously controlling extrusion line operation to maintain a predetermined length and weight for the finished product. Sensors for unit weight, extruder speed and swell, extruder load, extrudate temperature at the extruder and at the skiver, and conveyor speeds, signal conditioning circuits, and controls for take away conveyor speed, extruder speed, unit weight and skiver length.

40 Claims, 1 Drawing Figure

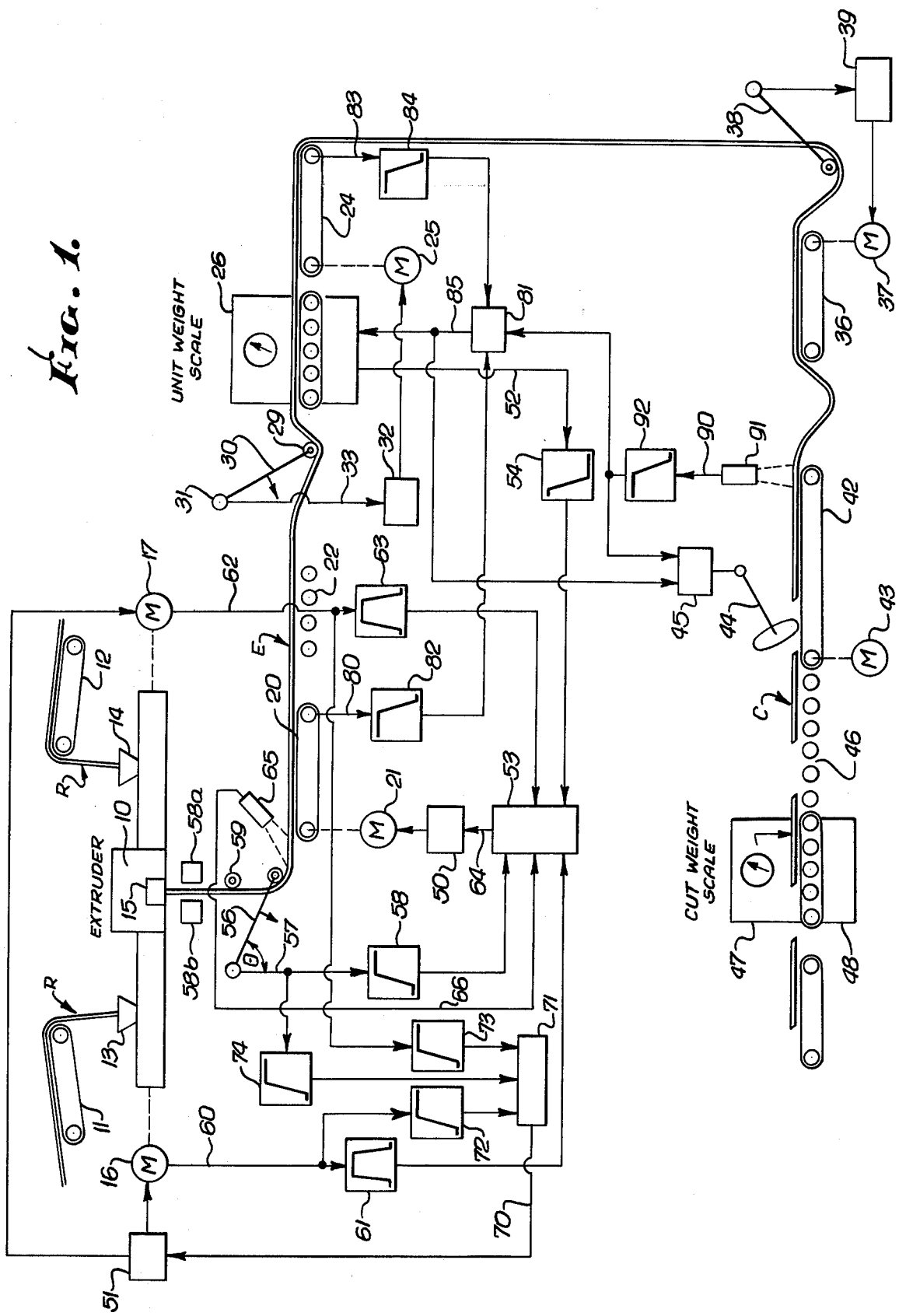

EXTRUSION LINE CONTROL SYSTEM

BACKGROUND OF THE INVENTION

This invention relates to automatic control of a continuous extrusion line such as is used in the production of rubber tire tread material.

On a continuous extrusion line feedstock material is prepared and conveyed to an extruder machine. The screw of the extruder machine propels the feedstock through the machine, compressing it and forcing it out through a die. The ultimate application of the extruded material determines the shape of the die. During the extrusion process the feedstock material is heated either in preparation or in the extruder itself and made plastic as it passes through the die. Following the extruder machine are a series of conveyors and shrinkage rolls on which the extruded material may be pulled and stretched, or allowed to shrink and become compacted. The extruded material (extrudate) cools and shrinks as it is conveyed away from the extruder machine to the end of the line. After leaving the line but before use in its application, the extruded material may shrink further as it cools to ambient temperature and its rheological properties change.

Though there are many variations on the extrusion process and many applications of extruded materials, the control method and apparatus of the present invention are quite general, and are not limited to the specific examples given. The invention will be disclosed as utilized for the case of rubber feedstock extruded into a continuous strip for use in tire tread and tire manufacture.

On a tire tread extrusion line rubber is continuously extruded and conveyed down the line. Near the end of the line it is cut (skived) into discrete sections and stored (booked) for later use in tire building. The tread rubber forms roughly 50 percent of the finished tire's weight, and tread quality has a strong effect on tire performance. Variations of cut tread weight and length are important indicators of tread quality. Uniformity of these parameters is a goal of the manufacturing process. It is the practice on extruder lines to set up the line to standard operating conditions for feedstock rubber, conveyor and screw speeds, feedmill, extruder and conveyor temperatures, and cutter (skiver) length. Most extruder lines are equipped with a continuous weighing scale for determining the weight per unit length (unit weight) of the continuous extrusion. Manual control of unit weight is performed by adjustment of the speed of the first conveyor (take-away conveyor) following the extruder and preceding the unit weight scale. This control is aimed at bringing the long term average unit weight to the standard (target) unit weight. Most extruder lines are also equipped with discrete weighing scales at the end of the line (booking station). These scales are used only for acceptance or rejection of the tread, rather than for control. Length measurements are made manually at the booking station.

Study of the extrusion process as it is currently practiced reveals variations in cut tread weight on the order of $\pm 2$-$4\%$, and variations in cut tread dimensions — length and width — on the order of $\pm 0.5$-$1.5\%$. These variations are caused by a complex interaction of rubber properties and mechanical operating conditions of the line. The rubber properties include rubber compound composition, rubber viscosity, density, hardness and other rheological properties. The addition of recycled (rework) rubber will result in changes of one or more of these rheological properties. The mechanical conditions of the line include feedstock rubber preparation (e.g. by milling — mill speeds, temperatures, mill gap settings, and roll separation forces), conveyor speeds, extruder screw speed, extruder machine hopper, screw, head, and die design, extruder and conveyor temperature controls, and rubber temperatures along the extruder line.

Approximately one-half the rubber in a tire goes into the tread, which indicates that precise control of tread weight is an important economic consideration. Also, while an extrusion line will operate substantially continuously there normally are a large number of die changes per shift and a particular run producing a tread of particular profile and size (more particularly, length and weight of the cut piece) and material may be on the order of $\frac{1}{2}$ to 4 hours with a resulting change in parameters with each change of die and/or material.

It is an object of the present invention to provide a new and improved method and apparatus for continuous and automatic control of a rubber extrusion line. It is a particular object of the invention to discover and identify the particular variations which adversely affect the performance of various components of the line and to provide control of these variations. Other objects, advantages, features and results will more fully appear in the course of the following description.

SUMMARY OF THE INVENTION

Two types of tread variation have been identified — variations within a production run due to changing rubber properties and operating conditions, and variations between runs due to changes in shrinkage rate from run to run. The invention described herein may be used to reduce both types of tread variation, individually and together.

Stated briefly, variations within a production run are reduced by continuous adjustment of extruder screw and/or take-away conveyor speeds, based on measurements of operating conditions such as unit weight, extrudate speed and swell, screw motor current, and others. The correlation between cut tread weight and continuous tread unit weight has been found to be in excess of 0.9. Therefore, for in-run variations the control system keeps unit weight at the target value. Variations within a run and between runs are reduced by continuous adjustment of the target values of unit weight and cut length based on factors related to long term shrinkage. Short term shrinkage as the tread moves down to the extrusion line and tread temperature at the booking station correlate strongly with long term shrinkage during tread storage.

In the preferred embodiment of the method, the weight measured at the unit weight scale and the extrudate speed and swell at the output of the extruder are sensed providing first and second signals, respectively. The first signal is filtered removing the short term components and the second signal is filtered removing the long term components. The speed of the take away conveyor is then controlled as a function of the combination of the first and second filtered signals. Further, the load of the extruder may be sensed producing a third signal which is filtered for removing short and long term components, with the filtered third signal being combined with the first and second filtered signals.

The preferred embodiment of the apparatus provides sensors, filters, drive means, and a control unit for automatically and continuously controlling the extrusion line.

BRIEF DESCRIPTION OF THE DRAWING

The single FIGURE of the drawing is a diagram illustrating a tire tread extrusion line incorporating the presently preferred embodiment of the control system of the invention.

DESCRIPTION OF THE PREFERRED EMBODIMENT

FIG. 1 shows a typical extrusion line and the sensors, signal lines and control devices to implement the control system. The particular extrusion line has a dual tuber extruder 10 of the kind used for producing tire tread. The feed rubber R is brought by feed conveyors 11, 12 to the tuber machine 10. The two sources of feed rubber may be different or identical in composition, depending on the tread specifications. The rubber is deposited in the hoppers 13, 14 of the dual tuber and propelled by the screws toward the extruder head and die 15. The extruder screws are driven by motors 16, 17. The rubber is forced through the die and falls onto the take away conveyor 20 which is driven by motor 21. At this point the extrudate E has begun to swell and shrink, changing its unit weight and effective line speed and is allowed to shrink freely on rollers 22. The tread is guided onto number 2 conveyor 24, which is driven by motor 25. The unit weight scale 26 is located at this position. The speed of the motor 25 is controlled by a dancer roll assembly and proportional controller 32 to maintain constant tension or constant loop position between conveyors 20, 24. The dancer roll consists of a roller 29 which rides on the tread, an arm 30 which pivots as the tread position changes, and a device such as a potentiometer 31 which translates arm movement into an electrical signal on line 33 for use in the controller.

One or more subsequent cooling conveyors 36 are driven by motors 37 which are in turn controlled by combinations of dancer rolls 38 and controllers 39. The number of these conveyors will vary depending on the physical configuration of the line. Another conveyor 42 and motor 43 for the section where the tread is skived (cut), follow the cooling conveyors. The skiver 44 and its controller 45 are located at this point. Following the skiver the cut tread C is again allowed to shrink freely on a series of rollers 46. The cut treads are sensed by a feeler arm 47 and weighed by the cut tread weight scale 48. They are then removed from the line and booked (stored). The system thus far described is conventional.

Several classes of in-run variations in the extrusion line have been discovered by frequency analysis of unit weight variation. Long term variations, with periods of 10 minutes to one hour, with a nominal center value of 20 minutes, are associated with gradual changes in rubber properties often due to batch-to-batch variation of feedstock material. Intermediate term variations, with periods of 1 to 10 minutes and a nominal center value of 5 minutes may be due to changes in rubber properties (such as the addition of rework rubber), and intermediate term mechanical changes (such as rubber distribution in the extruder hopper or in the extruder screw) often associated with changing rubber properties. Short term variations, with periods of 2 to 60 seconds and a preferred range of 10-30 seconds, may be due to changes in rubber properties (such as local discontinuities within a feedstock batch, e.g. "hard spots"), hopper disturbances, rubber distribution in the extruder screw, or variations of unit weight due to extruder screw pitch.

The control system of the invention provides for control of variations within a production run as follows:

1. Control of take away conveyor 20 speed using a correction signal derived from the unit weight scale 26 and filtered to include only the long term components of unit weight variation.

2. Control of take away conveyor 20 speed using a correction signal indicative of extruded material E speed or thickness or shrinkage and swell at the die exit, filtered to include only short term variations. Such signals may include, but are not limited to, a dancer roll indicating the position or speed of the tread, a contacting or non-contacting thickness gauge, or a pressure sensor within the die housing or extruder head.

3. Control of take away conveyor 20 speed using a correction signal derived from extruder screw motor 16, 17 current, or other indicators of screw loading, filtered to include only intermediate term components of current variation.

4. Control of the take away conveyor 20 speed using a correction signal based on extruded tread temperature, to account for the gradual warm-up of the rubber on starting a product run.

5. Control of extruder screw motor 16, 17 speed using a correction signal based on extruder screw motor current, suitably filtered to exclude long term variations.

6. Control of extruder screw motor 16, 17 speed using a correction signal indicative of extruded material speed or thickness or shrinkage and swell as in item 2 above.

The control system of the invention provides for control of variations both within a production run and between runs as follows:

7. Adjustment of unit weight target set point at the unit weight scale 26 using a correction signal based on the ratio between take away conveyor 20 speed and second conveyor 24 speed. The signal should be suitably filtered to include intermediate and long term components of the variation. Conveyors 24, 36 are operated with variable speeds adjusted to maintain constant tension between successive conveyors.

8. Adjustment of unit weight target set point using a correction signal based on tread temperature at the booking station or skiver 44, and filtered to include long term components of the variation.

9. Adjustment of skiver target set point for length at the skiver 44 using a correction signal based on the ratio between take away conveyor 20 speed and second conveyor 24 speed at the unit weight scale. The signal should be filtered to include intermediate and long term components of the variation.

10. Adjustment of the skiver target set point for length based on tread temperature at the skiver 44, filtered to include only intermediate and long term components of the variation.

The preferred embodiment of the invention includes the control of the speed of the take away conveyor 20 pursuant to items 1 and 2. A more precise control of the end product is achieved by incorporating item 3 in the control of the take away conveyor speed. Reduction of loss during start-up of each run is substantially reduced by incorporating item 4. Items 5 and 6 are used together for control of extruder speed and may be used separately or in combination with other control functions. Further improvement in operation is achieved by utilizing items 7, 8, 9 and 10 with items 1 and 2 and/or items 5 and 6. Items 7-9 may be used together or individually as desired. One especially suitable combination for presently existing extrusion lines is the combination of items 1, 2, 3 and 7. Most existing extrusion lines do not readily provide for control of the speed of the extruder screw. However in instances where extruder speed control is available, items 5 and 6 are highly desirable.

While all the items of a particular system normally are in operation during a run, it is usually preferred to bring one control at a time into service during start up, rather than starting all controls at the same time.

The control system includes motor controller 50 for the take away conveyor motor 21 and motor controller 51 for the extruder screw motors 16, 17. The signal on line 52 from the unit weight scale 26 is fed to a control unit 53 through a low pass filter 54 designed to remove the short term components of the signal.

A dancer roll assembly 56 similar to the assemblies 29-31 and 38, is positioned to engage the extrudate between the extruder 10 and the take away conveyor 20 and generates a signal on line 57 indicative of the angle $\theta$ of the extrudate between the extruder and the take away conveyor. This angle is a function of the extrudate speed and swell. The signal on line 57 is connected to the control unit 53 through a high pass filter 58. Alternatively, the signal on line 57 indicative of extrudate speed and swell can be obtained by utilizing a thickness gauge indicated at 58a, 58b, or by a pressure sensor at the die 15, or by a fixed position roller 59 which engages and provides a measure of tension in the extrudate. The expression "speed and swell" is used to define the characteristic of the extrudate measured by these devices.

A signal representative of the load on the extruder motor 16, typically a measure of the motor current, is provided on line 60 and is connected to the control unit 53 through a band pass filter 61. Similarly, a signal on line 62 indicative of the load on the extruder motor 17 is connected to the control unit through another band pass filter 63. Where the extruder has a single screw and drive motor, only one such signal will be utilized. The signals to the control unit 53 are combined to provide a correction signal on line 64 for the take away conveyor motor controller 50. The band pass filters 61, 63 function to remove the short term and long term components in the signals, leaving only the intermediate term components representing the intermediate term variations in extruder load. The filter 58 is a high pass filter leaving only the short term components, and the filter 54 is a low pass filter leaving only the long term components. In the simplest form of systems, the signals are combined linearly, but they may be combined in more complex relationships where desired.

A temperature measurement device, such as a radiation pyrometer 65 provides a signal on line 66 to the control unit indicative of the temperature of the extrudate and provides for varying the take away conveyor speed on starting a product run as a function of the temperature, compensating for the gradual warm-up of the extrudate.

The controller 51 for the extruder screw motors 16, 17 receive a signal on line 70 from a control unit 71 having two inputs. One input to the control unit 71 is the signals on lines 60, 62, representative of the load current of the screw motors 16, 17, with these signals passing through filters 72, 73, each being a high pass filter for removing long term components. The other input to the control unit 71 is the signal on line 57 connected through another filter 74 which also is a high pass filter removing long term components of the signal. The control unit 71 combines these signals to provide a correction signal for the motor controller.

Variations both between and within production runs may be corrected by varying the set point for tread unit weight at the unit weight scale 26 and the set point for the cut tread length at the skiver 44. A sensor at the take away conveyor 20 provides a signal on line 80 varying as a function of conveyor speed, which signal is connected to a control unit 81 through a low pass filter 82 which removes short term components of the signal. A similar sensor provides a signal on line 83 representative of the speed of the conveyor 24, with this signal connected to the control unit 81 through another low pass filter 84 which removes short term components of the signal. The two speed signals are combined at the control unit 81 providing an output on line 85 to the unit weight scale 26 for changing the weight set point signal, and to the skiver controller 45 for changing the length set point. Long term variation of tread weight may be controlled by using a signal on line 90 from another radiation pyrometer 91, which signal is connected through a low pass filter 92 removing short term components, providing another input to the controller 81 and the controller 45.

The sensors for generating the various signals representative of the operating conditions, and the filters may be conventional components. The combining of the signals at the control units may be done in the conventional manner. Simple algorithms may be developed for the signals and several examples are set out below.

For item 1, the variation of take away (#1) conveyor speed as a function of unit weight:

$$V_1 = R_{v1} + M_{wt}$$

$$M_{wt}(n) = K_{wt} X_{wt} \epsilon_{wt}(n-1) + V_{wt} M_{wt}(n-1)$$

where:
$V_1$ = #1 conveyor speed
$R_{v1}$ = #1 conveyor speed set point
$M_{wt}$ = manipulated value for #1 conveyor speed based on unit weight error
$X_{wt} = 1 - e^{-a\tau}$
$V_{wt} = e^{-a\tau}$
$a = 1/T_{wt}$
$\tau$ = sample interval
$K_{wt}$ = control gain
$\epsilon_{wt}$ = unit weight error
$n$ = sample number
$T_{wt}$ = filter constant For item 2, variation of take away conveyor speed as a function of extrusion angle:

$$V_1 = R_{v1} - M_{at}$$

$$M_{at}(n) = K_{at}[\epsilon_{at}(n) - \epsilon_{at}(n-1)] + V_{at} M_{at}(n-1)$$

where:
$V_1$ = #1 conveyor speed
$R_{v1}$ = #1 conveyor speed set point
$M_{at}$ = manipulated value for #1 conveyor speed based on extrusion angle
$V_{at} = e^{-a\tau}$
$a = 1/T_{at}$
$T_{at}$ = filter constant
$\tau$ = sample period
$K_{at}$ = control gain $\epsilon_{at}$ = extrusion angle
$n$ = sample number For item 3, variation of take away conveyor speed as a function of extruder motor current. Since a tire tread extruder usually includes two extruder screws and screw motors (16 and 17 in the drawing), the subscript $\alpha$ will designate which motor current is being referred to. As an example of a band-pass filter for intermediate term components of the motor current signal we may use a difference of two low-pass filters $F^\beta$. The superscript $\beta$ may take the values 1 or 2. A superscript 1 will denote the filter with the longer time constant, while the superscript 2 will denote the filter with the shorter time constant.

$$V_1 = R_{v1} + M_I$$

$$M_{Ia} = K_I(F_\alpha^2 - F_\alpha^1)$$

$$F_\alpha^\beta(n) = X_\beta I(n-1) + V_\beta F_\alpha^\beta(n-1)$$

where:
$V_1$ = #1 conveyor speed
$R_{v1}$ = #1 conveyor speed set point
$M_I$ = manipulated value for #1 conveyor speed based on motor current
$K_I$ = control gain
$F_\alpha^\beta$ = filtered value of motor current
$X_\beta = 1 - e^{-a\beta\tau}$
$V_\beta = e^{-a\beta\tau}$
$a_\beta = 1/T_\beta$
$T_\beta$ = filter time constant
$\tau$ = sample interval
$I$ = measured motor current
$n$ = sample number For item 4, variation of take-away conveyor speed as a function of tread temperature:

$$V_1 = R_{v1} + M_{sts}$$

where:
$V_1$ = #1 conveyor speed
$R_{v1}$ = #1 conveyor speed set point
$M_{sts}$ = manipulated value for #1 conveyor speed based on tread warm-up.

Two approaches may be used to determine $M_{sts}$ — one based on tread warm-up as a function of time, and one based on measured tread temperature. The algorithm for tread warm-up vs. time is, $$M_{sts}(n) = V_{sts} M_{sts}(n-1)$$

where:
$V_{sts} = e^{-a\tau}$
$a = 1/T_{sts}$
$T_{sts}$ = filter constant
$\tau$ = sample interval
$n$ = sample number The algorithm based on measured tread temperature is, $$M_{sts} = (V_{1max} - R_{v1}) e^{-(t-t_o)/t_s} \text{ for } t > t_o$$

$$M_{sts} = (V_{1max} - R_{v1}) \text{ for } t < t_o$$

where:
$V_{1max}$ = maximum value of #1 conveyor speed for the product being run
$t$ = measured temperature at extruder die exit
$t_o, t_s$ = filter constants For item 7, variation of unit weight target set point as a function of ratio of speeds of take away and unit weight scale conveyors:

$$R^1 = R_{wt}[1 + K_{sh}\{1 - C_{sh}(M_{v2}/M_{v1})\}]$$

where:
$R^1$ = corrected value of unit weight target
$M_{v2}(n) = X_v v_2(n-1) + V_v M_{v2}(n-1)$
$M_{v1}(n) = X_v v_1(n-1) + V_v M_{v1}(n-1)$
$R_{wt}$ = unit weight target
$M_{v1}$ = filtered value of take away conveyor speed
$M_{v2}$ = filtered value of #2 conveyor speed
$K_{sh}$ = shrinkage predictive gain factor
$C_{sh}$ = initial value of shrinkage
$X_v = 1 - e^{-a\tau}$
$V_v = e^{31\,a\tau}$
$a = 1/T_v$
$T_v$ = filter constant
$\tau$ = sample period
$v_1$ = take away conveyor speed
$v_2$ = #2 conveyor speed
$n$ = sample number For item 9, variation of skiver target set point as a function of shrinkage, i.e., ratio of speeds of take away and unit weight scale conveyors. This is very similar to the measurement algorithm for item 7 (shrinkage prediction biasing of unit weight set point). The major difference is that this algorithm takes into account the transport lag between the take-away conveyor and the skiver.

$$R^1 = R_{sk}[1 + K_{sk}\{1 - C_{sh}(M_{v2}/M_{v1})\}]$$

where
$R^1$ = corrected value of skiver length target
$R_{sk}$ = skiver length target
$M_{v2}(n) = X_v v_2(n-m-1) + V_v M_{v2}(n-m-1)$
$M_{v1}(n) = X_v v_1(n-m-1) + V_v M_{v1}(n-m-1)$
$M_{v1}$ = filtered value of take-away conveyor speed
$M_{v2}$ = filtered value of #2 conveyor speed
$K_{sk}$ = shrinkage predictive gain factor
$C_{sh}$ = initial value of shrinkage
$X_v = 1 - e^{-a\tau}$
$V_v = e^{-a\tau}$
$a = 1/T_v$
$T_v$ = filter constant
$\tau$ = sample period
$v_1$ = take away conveyor speed
$v_2$ = #2 conveyor speed
$n$ = sample number
$m$ = integral number of sample times, where $m\tau$ is the transport lag from the take-away conveyor to the skiver.

Take-away conveyor speed typically is adjusted based on threee types of signals - unit weight (item 1), extruded tread speed or extrusion angle (item 2), and screw motor current (item 3). The manipulated values, $M_{wT}$, $M_{aT}$, and $M_I$ normally produce only small deviations from the set-point value, and may be combined linearly. The appropriate weighting and sign may be set at the control gain. In the case of a dual tuber (i.e. one with two screws), the values of $M_I$ for each screw would be weighted again, proportional to the mass of the feed rubber input to that screw.

We claim:
1. In a rubber extrusion line having an extruder, a take away conveyor, a unit weight scale, and a skiver, with the extrudate moving in a continuous strip from said extruder onto said take away conveyor, past said unit weight scale to said skiver, the improvement comprising in combination:

- drive means coupled to said take away conveyor for controlling the speed of said take away conveyor in response to a drive signal;
- a first sensor connected to said unit weight scale for producing a first signal varying as a function of the weight measured at said unit weight scale;
- a second sensor positioned adjacent the outlet of said extruder for producing a second signal varying as a function of extrudate speed and swell at the outlet of said extruder;
- a first low pass filter with means for connecting said first signal as an input for substantially removing short term components of said first signal;
- a second high pass filter with means for connecting said second signal as an input for substantially removing long term components of said second signal, where a long term component varies with a period of about 10 to about 60 minutes and a short term component varies with a period of about 2 to about 60 seconds; and
- a control unit with means for connecting the outputs of said first and second filters as inputs for combining the inputs producing a drive signal for said drive means.

2. A rubber extrusion as defined in claim 1 wherein said second sensor includes a member for engaging the extrudate and measuring the angle of the extrudate as it moves from said extruder to said take away conveyor.

3. A rubber extrusion as defined in claim 1 wherein said second sensor includes means for measuring the thickness of said extrudate as it moves from said extruder to said take away conveyor.

4. A rubber extrusion as defined in claim 1 wherein said second sensor includes means for measuring the pressure of extrudate at said extruder.

5. A rubber extrusion as defined in claim 1 including:
- a third sensor coupled to said extruder for producing a third signal varying as a function of the load of said extruder; and
- a third band pass filter with means for connecting said third signal as an input for substantially removing short and long term components of said third signal, and with means for connecting the output of said third filter as an input to said control unit.

6. A rubber extrusion as defined in claim 5 wherein said extruder includes a motor driven screw and said third sensor includes means for measuring the current of said extruder motor.

7. A rubber extrusion line defined in claim 5 including:
- a second conveyor at said unit weight scale;
- reference means at said unit weight scale for setting a unit reference weight in response to a set signal;
- a fourth sensor connected to said take away conveyor for producing a fourth signal varying as a function of the speed of said take away conveyor;
- a fifth sensor connected to said second conveyor for producing a fifth signal varying as a function of the speed of said second conveyor;
- low pass filter means with means for connecting said fourth and fifth signals as inputs for substantially removing short term components of said fourth and fifth signals; and
- set means having the output of said filter means as input for providing a set signal for said reference means.

8. A rubber extrusion as defined in claim 7 including first speed control means coupled to said second conveyor for varying the speed of said second conveyor to maintain substantially constant tension in the extrudate between said take away conveyor and said second conveyor.

9. A rubber extrusion as defined in claim 8 including:
- a third conveyor between said second conveyor and said skiver; and
- second speed control means coupled to said third conveyor for varying the speed of said third conveyor to maintain substantially constant tension in the extrudate between said second and third conveyors.

10. A rubber extrusion as defined in claim 7 including:
- second reference means at said skiver for setting a reference length for cutting in response to a length signal;
- a sixth sensor positioned adjacent said skiver for producing a sixth signal varying as a function of the extrudate temperature at said skiver;
- a sixth low pass filter with means for connecting said sixth signal as an input for substantially removing short term components of said sixth signal; and
- length means with means for connecting the output of said sixth filter as input for providing a length signal for said second reference means.

11. A rubber extrusion as defined in claim 7 including:
- second reference means at said skiver for setting a reference length for cutting in response to a length signal; and
- length means with means for connecting the output of said filter means as input for providing a length signal for said second reference means.

12. A rubber extrusion as defined in claim 7 including:
- a sixth sensor positioned adjacent said skiver for producing a sixth signal varying as a function of the extrudate temperature at said skiver; and
- a sixth low pass filter with means for connecting said sixth signal as an input for substantially removing short term components of said sixth signal, and with means for connecting the output of said sixth filter as an input to said set means.

13. A rubber extrusion as defined in claim 7 including a sixth sensor positioned adjacent said take away conveyor for providing a sixth signal varying as a function of the extrudate temperature at said take away conveyor, with means for connecting said sixth signal as an input to said control unit.

14. A rubber extrusion as defined in claim 7 including:
- extruder speed control means coupled to said extruder for controlling the speed of said extruder in response to a speed signal;
- high pass filter means with means for connecting said second and third signals as input for substantially removing long term components of said second and third signals; and
- a speed unit with means for connecting the output of said high pass filter means as input for providing a speed signal for said speed control means.

15. A rubber extrusion as defined in claim 5 including a fourth sensor positioned adjacent said take away conveyor for producing a fourth signal varying as a function of the extrudate temperature at said take away conveyor, with means for connecting said fourth signal as an input to said control unit.

16. A rubber extrusion as defined in claim 5 including:
extruder speed control means coupled to said extruder for controlling the speed of said extruder in response to a speed signal;
high pass filter means with means for connecting said second and third signals as input for substantially removing long term components of said second and third signals; and
a speed unit with means for connecting the output of said high pass filter means as input for providing a speed signal for said speed control means.

17. A rubber extrusion line as defined in claim 1 including:
a second conveyor at said unit weight scale;
reference means at said unit weight scale for setting a unit reference weight in response to a set signal;
a third sensor connecting to said take away conveyor for producing a third signal varying as a function of the speed of said take away conveyor;
a fourth sensor connected to said second conveyor for producing a fourth signal varying as a function of the speed of said second conveyor;
low pass filter means with means for connecting said third and fourth signals as inputs for substantially removing short term components of said third and fourth signals; and
set means having the output of said filter means as input for providing a set signal for said reference means.

18. A rubber extrusion as defined in claim 1 including a third sensor positioned adjacent said take away conveyor for producing a third signal varying as a function of the extrudate temperature at said take away conveyor, with means for connecting said third signal as an input to said control unit.

19. A rubber extrusion as defined in claim 1 including:
a third sensor coupled to said extruder for producing a third signal varying as a function of the load of said extruder;
a third band pass filter with means for connecting said third signal as an input for substantially removing short and long term components of said third signal, and with means for connecting the output of said filter as an input to said control unit;
extruder speed control means coupled to said extruder for controlling the speed of said extruder in response to a speed signal;
high pass filter means with means for connecting said second and third signals as input for substantially removing long term components of said second and third signals; and
a speed unit with means for connecting the output of said high pass filter means as input for providing a speed signal for said speed control means.

20. A rubber extrusion as defined in claim 1 wherein said second sensor includes means for measuring the tension in said extrudate.

21. In a rubber extrusion line having an extruder, a take away conveyor, a unit weight scale, and a skiver, with the extrudate moving in a continuous strip from said extruder onto said take away conveyor, past said unit weight scale to said skiver, the improvement comprising in combination:
a first sensor coupled to said extruder for producing a first signal varying as a function of the load of said extruder;
a second sensor positioned adjacent the outlet of said extruder for producing a second signal varying as a function of extrudate speed and swell at the outlet of said extruder;
extruder speed control means coupled to said extruder for controlling the speed of said extruder in response to a speed signal;
high pass filter means with means for connecting said first and second signals as input for substantially removing long term components of said first and second signals, where a long term component varies with a period of about 10 to about 60 minutes and a short term component varies with a period of about 2 to about 60 seconds; and
a speed unit with means for connecting the output of said high pass filter means as input for providing a speed signal for said speed control means.

22. A rubber extrusion as defined in claim 21 including:
drive means coupled to said take away conveyor for controlling the speed of said take away conveyor in response to a drive signal;
a third sensor positioned adjacent said take away conveyor for producing a third signal varying as a function of the extrudate temperature at said take away conveyor; and
a control unit with means for connecting the output of said third sensor as input for producing a drive signal for said drive means.

23. A rubber extrusion as defined in claim 21 wherein said second sensor includes a member for engaging the extrudate and measuring the angle of the extrudate as it moves from said extruder to said take away conveyor.

24. A rubber extrusion as defined in claim 21 wherein said second sensor includes means for measuring the thickness of said extrudate as it moves from said extruder to said take away conveyor.

25. A rubber extrusion as defined in claim 21 wherein said second sensor includes means for measuring the pressure of extrudate at said extruder.

26. A rubber extrusion as defined in claim 21 wherein said second sensor includes means for measuring the tension in said extrudate.

27. A rubber extrusion as defined in claim 21 wherein said extruder includes a motor driven screw and said first sensor includes means for measuring the current of said extruder motor.

28. A rubber extrusion live as defined in claim 21 including
a second conveyor at said unit weight scale;
reference means at said unit weight scale for setting a unit reference weight in response to a set signal;
a third sensor connected to said take away conveyor for producing a third signal varying as a function of the speed of said take away conveyor;
a fourth sensor connected to said second conveyor for producing a fourth signal varying as a function of the speed of said second conveyor;
low pass filter means with means for connecting said third and fourth signals as inputs for substantially removing short term components of said third and fourth signals; and
set means having the output of said filter means as input for providing a set signal for said reference means.

29. A rubber extrusion as defined in claim 28 including first speed control means coupled to said second conveyor for varying the speed of said second conveyor to maintain substantially constant tension in the extrudate between said take away conveyor and said second conveyor.

30. A rubber extrusion as defined in claim 29 including:
a third conveyor between said second conveyor and said skiver; and
second speed control means coupled to said second conveyor for varying the speed of said third conveyor to maintain substantially constant tension in the extrudate between said second and third conveyors.

31. A method of controlling a rubber extrusion line having an extruder, a take away conveyor, a unit weight scale, and a skiver, with the extrudate moving in a continuous strip from the extruder onto the take away conveyor, past the unit weight scale to the skiver, including the steps of:
sensing the weight measured at the unit weight scale and producing a first signal varying as a function of the weight;
sensing the extrudate speed and swell at the output of the extruder and producing a second signal varying as a function of the speed and swell;
filtering the first signal substantially removing short term components thereof;
filtering the second signal substantially removing long term components thereof, where a long term component varies with a period of about 10 to about 60 minutes and a short term component varies with a period of about 2 to about 60 seconds; and
varying the speed of the take away conveyor as a function of the combination of the filtered first and second signals.

32. The method as defined in claim 31 including:
sensing the load of the extruder and producing a third signal varying as a function of the load;
filtering the third signal substantially removing short and long term components thereof; and
varying the speed of the take away conveyor as a function of the combination of the filtered first, second and third signals.

33. The method as defined in claim 32 including:
sensing the speed of the take away conveyor and producing a fourth signal varying as a function of the speed of the take away conveyor;
sensing the speed of a second conveyor at the unit weight scale and producing a fifth signal varying as a function of the speed of the second conveyor;
filtering the fourth and fifth signals substantially removing short term components thereof; and
varying the reference weight at the unit weight scale as a function of the combination of the filtered fourth and fifth signals.

34. The method as defined in claim 33 including varying the speed of the second conveyor to maintain substantially constant tension in the extrudate between the take away conveyor and the second conveyor.

35. The method as defined in claim 33 including:
filtering the second and third signals substantially removing long term components thereof; and
varying the speed of the extruder as a function of the combination of the filtered second and third signals.

36. The method as defined in claim 31 including:
sensing the speed of the take away conveyor and producing a third signal varying as a function of the speed of the take away conveyor;
sensing the speed of a second conveyor at the unit weight scale and producing a fourth signal varying as a function of the speed of the second conveyor;
filtering the third and fourth signals substantially removing short term components thereof; and
varying the reference weight at the unit weight scale as a function of the combination of the filtered third and fourth signals.

37. The method as defined in claim 36 including:
sensing the load of the extruder and producing a fifth signal varying as a function of the load;
filtering the second and fifth signals substantially removing long term components thereof; and
varying the speed of the extruder as a function of the combination of the filtered second and fifth signals.

38. The method as defined in claim 31 including:
sensing the load of the extruder and producing a third signal varying as a function of the load;
filtering the third signal substantially removing long term components thereof; and
varying the speed of the extruder as a function of the combination of the filtered second and third signals.

39. A method of controlling a rubber extrusion line having an extruder, a take away conveyor, a unit weight scale, and a skiver, with the extrudate moving in a continuous strip from the extruder onto the take away conveyor, past the unit weight scale to the skiver, including the steps of:
sensing the extrudate speed and swell at the output of the extruder and producing a first signal varying as a function of the speed and swell;
sensing the load of the extruder and producing a second signal varying as a function of the load;
filtering the first and second signals substantially removing long term components thereof where a long term component varies with a period of about 10 to about 60 minutes and a short term component varies with a period of about 2 to about 60 seconds; and
varying the speed of the extruder as a function of the combination of the filtered first and second signals.

40. The method as defined in claim 39 including:
sensing the speed of the take away conveyor and producing a third signal varying as a function of the speed of the take away conveyor;
sensing the speed of a second conveyor at the unit weight scale and producing a fourth signal varying as a function of the speed of the second conveyor;
filtering the third and fourth signals substantially removing short term components thereof; and
varying the reference weight at the unit weight scale as a function of the combination of the filtered third and fourth signals.

* * * * *